(12) United States Patent
Kumar (10) Patent No.: US 7,926,049 B1
(45) Date of Patent: Apr. 12, 2011

(54) SYSTEM AND METHOD FOR DETERMINING DIFFERENCES BETWEEN SOFTWARE CONFIGURATIONS

(75) Inventor: Ravindra Kumar, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 1120 days.

(21) Appl. No.: 11/388,174

(22) Filed: Mar. 23, 2006

(51) Int. Cl.
G06F 9/45 (2006.01)
(52) U.S. Cl. .......................................... 717/170
(58) Field of Classification Search ................... 717/170
See application file for complete search history.

(56) References Cited

U.S. PATENT DOCUMENTS

| | | | |
|---|---|---|---|
| 5,819,292 A | 10/1998 | Hitz | |
| 6,654,954 B1 * | 11/2003 | Hicks | 717/162 |
| 6,748,510 B1 | 6/2004 | Coatney | |
| 7,058,639 B1 * | 6/2006 | Chatterjee et al. | 1/1 |
| 7,096,421 B2 * | 8/2006 | Lou | 715/234 |
| 7,353,225 B2 * | 4/2008 | Dada | 1/1 |
| 7,409,494 B2 | 8/2008 | Edwards | |
| 7,487,381 B1 | 2/2009 | Beaman | |
| 7,562,208 B1 | 7/2009 | Reed | |
| 7,565,519 B1 | 7/2009 | Kumar | |
| 7,577,797 B2 | 8/2009 | Clark | |
| 7,650,429 B2 * | 1/2010 | Panigrahy et al. | 709/245 |
| 7,702,897 B2 | 4/2010 | Reed | |
| 2004/0030668 A1 | 2/2004 | Pawlowski | |
| 2004/0083347 A1 * | 4/2004 | Parson | 711/165 |
| 2004/0117438 A1 * | 6/2004 | Considine et al. | 709/203 |
| 2004/0162805 A1 * | 8/2004 | Wozniak | 707/1 |
| 2009/0328024 A1 * | 12/2009 | Li et al. | 717/169 |

* cited by examiner

*Primary Examiner* — John Chavis
(74) *Attorney, Agent, or Firm* — Cesari and McKenna, LLP (57) ABSTRACT

A system and method for determining differences between configurations of a software program. A configuration differencing command generates a hash table of configuration keys and values for each of the configurations being compared. A key is selected from a first hash table and the command determines if an identical key exists in the second hash table. If the key exists in the second hash table, a comparison is made of the values associated with the keys and, if the values are not identical, the configuration differencing command displays the differences to an administrator.

22 Claims, 4 Drawing Sheets

SYSTEM AND METHOD FOR DETERMINING DIFFERENCES BETWEEN SOFTWARE CONFIGURATIONS

FIELD OF THE INVENTION

The present invention relates to storage systems and, more specifically, to determining differences between software configurations of storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of data containers, such as directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., of Sunnyvale, Calif.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

A storage system may embody a plurality of configurations that specify options for various attributes of the system, e.g., types of protocols to be utilized, identities of volumes to be exported, as well as recent upgrade/reversion of software executing on the storage system. These storage system configurations are typically stored as one or more text files (configuration files) on the storage system. Often, storage system administrators need to know the differences between configurations stored on the storage system, such as for example, to determine whether a configuration has changed, to build automated systems for checking the system configuration or to determine the actual changes in configuration. A conventional technique for identifying changes between configurations is to concatenate the plurality of configuration files and apply a conventional differential operation (such as, e.g. via the conventional UNIX diff command) to the catenated files. However, a noted disadvantage is that if any configuration settings span more than one line, the diff command may identify potentially erroneous differences, i.e., false positives. A further disadvantage is that the diff command may generate false positives (i.e., identify differences in configurations) when the configuration files include options in differing orders, even if the order is irrelevant to the configuration.

SUMMARY OF THE INVENTION

The present invention overcomes the disadvantages of the prior art by providing a system and method for determining effective differences between configurations of software, such as a storage operating system, executing on a storage system. By effective differences it is meant differences between two configurations that would be effective when the two configurations are applied to a system. A novel configuration differencing command is implemented within a user interface of the storage operating system. For each configuration, the configuration differencing command generates a hash table having a plurality of entries, wherein each entry includes (i) a key representing a particular configuration option, and (ii) an associated value representing a current setting of that option for the configuration. The hash tables are illustratively generated by reading keys from configurations in a way that lower precedence keys are read before higher precedence keys. A key is read and entered into the hash table. Should a higher precedence key be identical to a previously read lower precedence key, the higher precedence key is overwritten onto the lower precedence key within the hash table. Once the hash tables have been generated for all configurations of the software, the configuration differencing command selects a first key from an entry of a first hash table and compares that key with keys from entries of the other hash tables. If a matching key exists in an entry of another hash table, the configuration differencing command determines whether the values associated therewith match. If so, then the two entries are removed from both of the hash tables. In an alternate embodiment, the matching entries may be marked as common.

If the values do not match, the configuration differencing command displays the differences to an administrator and the two entries are removed from both of the hash tables. The configuration differencing command then selects a second key from a second entry of the first hash table and repeats the procedure described above. Once each key from the first hash table has been selected and processed according to the present invention, any keys that are left in the first hash table and in the second hash table (or, in an alternate embodiment, keys that are not marked as common) are keys that are unique to the configuration associated with that table.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
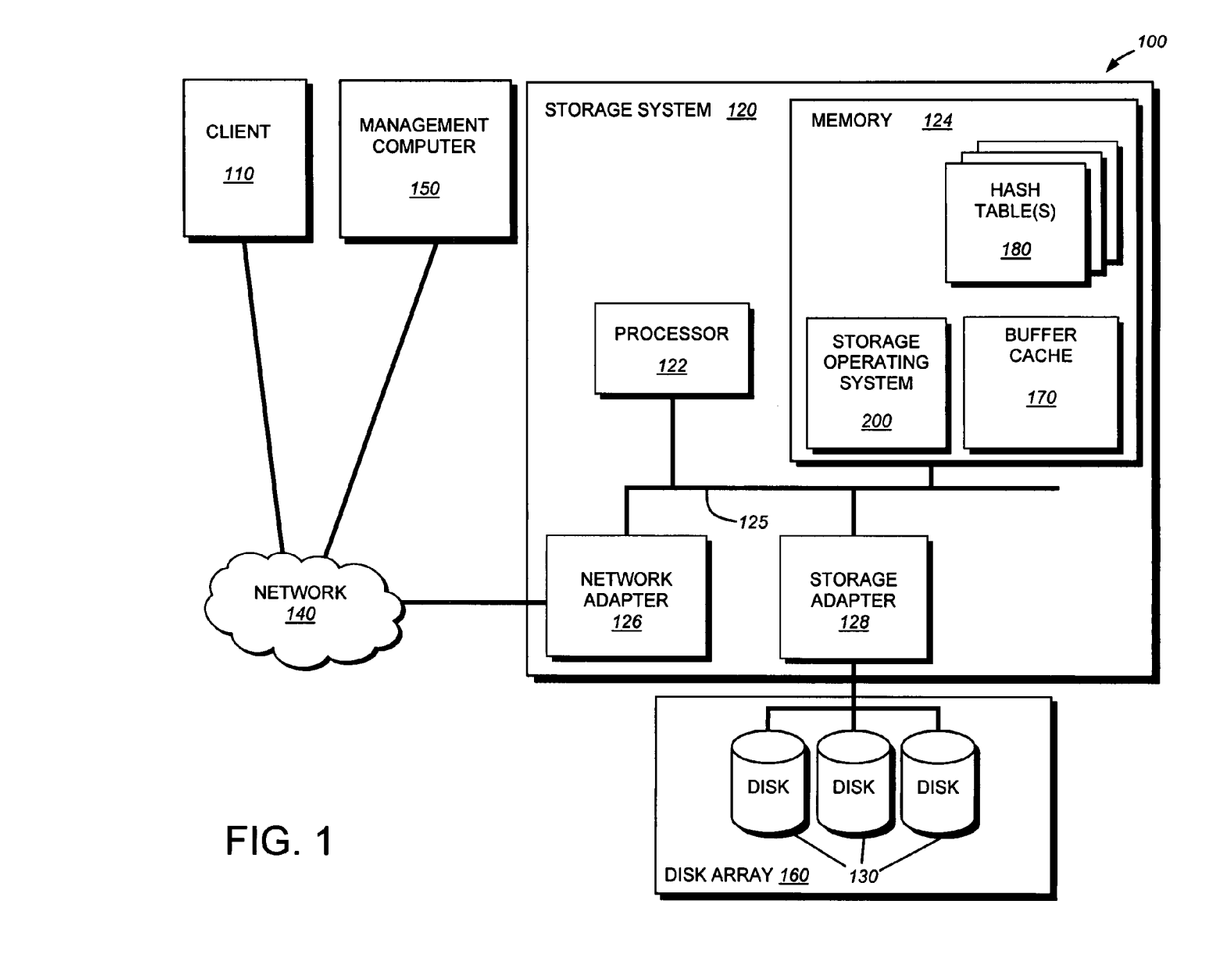
FIG. 1 is a schematic block diagram of an exemplary storage system environment in accordance with an embodiment of the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and virtual disks ("vdisks") on the disks.

In the illustrative embodiment, the memory 124 comprises storage locations that are addressable by the processor and adapters for storing software program code. A portion of the memory may be further organized as a "buffer cache" 170 for storing certain data structures associated with the present invention. The processor and adapters may, in turn, comprise processing elements and/or logic circuitry configured to execute the software code and manipulate the data structures. An example of such data structuring is a set of hash tables 180 that are constructed by a novel configuration differencing command 277, described further below. The hash tables 180 contain pairings of configuration keys and values for configurations of software compared in accordance with an embodiment of the present invention. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications thereon. Moreover, the client 110 may interact with the storage system 120 in accordance with a client/server model of information delivery. That is, the client may request the services of the storage system, and the system may return the results of the services requested by the client, by exchanging packets over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Alternately, the information may be implemented as one or more aggregates comprising of one or more flexible (virtual) volumes. Aggregates and flexible volumes are described in detail in U.S. patent application Ser. No. 10/836,817, entitled EXTENSION OF WRITE ANYWHERE FILE SYSTEM LAYOUT, by John K. Edwards, et al.

The disks within the file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Also connected to network 140 is a management computer 150 that is utilized by an administrator to access storage system 120 to perform management functions. In alternate embodiments, the administrator may perform management functions from other computers, including, e.g., from client 110 and/or by directly accessing storage system 120. The management computer 150 may illustratively comprise a local console for use in maintaining the storage system 120.

B. Storage Operating System

To facilitate access to the disks 130, the storage operating system 200 illustratively implements a write-anywhere file system that cooperates with virtualization modules to "virtualize" the storage space provided by disks 130. The file system logically organizes the information as a hierarchical structure of named data containers, e.g., directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 2:
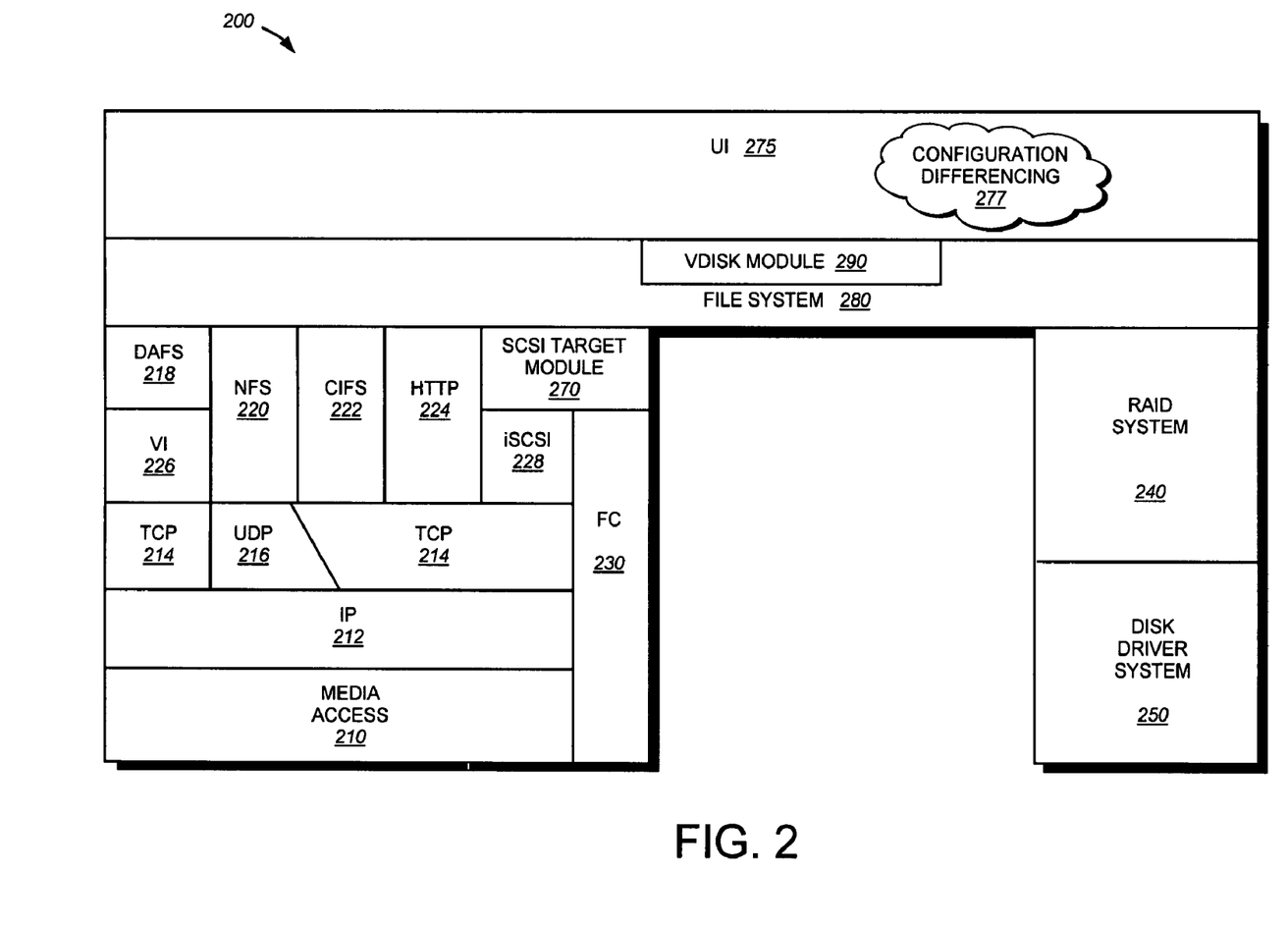
FIG. 2 is a schematic block diagram of a storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for, inter alia, the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage is module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 cooperates with the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

In accordance with an illustrative embodiment of the present invention, the UI 275 implements a novel configuration differencing command 277 that determines differences between software configurations on the storage system. It should be noted that, in alternate embodiments, the configuration differencing command 277 may be implemented in other modules of the storage operating system or, in further alternate embodiments, implemented external to the storage operating system, such as on management computer 150. As such, the description of the configuration differencing command 277 being implemented within the UI 275 should be regarded as exemplary only.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. Volume information (volinfo) and file system information (fsinfo) blocks specify the layout of information in the file system, the latter block including an inode of a file that includes all other inodes of the file system (the inode file). Each logical volume (file system) has an fsinfo block that is preferably stored at a fixed location within, e.g., a RAID group. The inode of the fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in-core", i.e., in the buffer cache 170. If the information is not in the cache, the file system 280 indexes into the inode file using the inode number to access an appropriate entry and retrieve a logical volume block number (vbn). The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from is the specified disk 130 and loads the requested data block(s) in buffer cache 170 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the ONTAP software is an example of such a storage operating system implemented as a microkernel and including the file system module to implement the write anywhere file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or storage appliance) or general-purpose computer, including a standalone computer or portion thereof, embodied as or including a storage system 120. An example of a storage appliance that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Volume Structure and Configuration

The file system, such as the write-anywhere file system, maintains information about the geometry of the underlying physical disks (e.g., the number of blocks in each disk) in the storage system. The RAID system provides the disk geometry information to the file system for use when creating and maintaining the vbn-to-disk,dbn mappings used to perform write allocation operations. The file system maintains block allocation data structures, such as an active map, a space map, a summary map and snapmaps, that describe which blocks are currently in use and which are available for use and are used by the file system 280 as existing infrastructure for the logical volume.

Specifically, the snapmap denotes a bitmap file describing which blocks are used by a snapshot. The write-anywhere file system (such as the WAFL file system) has the capability to generate a snapshot of its active file system. An "active file system" is a file system to which data can be both written and read or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports (maintains) multiple PCPIs that are generally created on a regular schedule. Each PCPI refers to a copy of the file system that diverges from the active file system over time as the active file system is modified. Each PCPI is a restorable version of the storage element (e.g., the active file system) created at a predetermined point in time and, as noted, is "read-only" accessible and "space-conservative." Space conservative denotes that common parts of the storage element in multiple snapshots share the same file system blocks. Only the differences among these various PCPIs require extra storage blocks. The multiple PCPIs of a storage element are not independent copies, each consuming disk space; therefore, creation of a PCPI on the file system is instantaneous, since no entity data needs to be copied. Read-only accessibility denotes that a PCPI cannot be modified because it is closely coupled to a single writable image in the active file system. The closely coupled association between a file in the active file system and the same file in a PCPI obviates the use of multiple "same" files. In the example of a WAFL file system, PCPIs are described in TR3002 *File System Design for a NFS File Server Appliance* by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., each of which is hereby incorporated by reference as though full set forth herein.

The active map denotes a bitmap file describing which blocks are used by the active file system. As previously described, a PCPI may contain metadata describing the file system as it existed at the point in time that the image was taken. In particular, a PCPI captures the active map as it existed at the time of PCPI creation; this file is also known as the snapmap for the PCPI. Note that a snapmap denotes a bitmap file describing which blocks are used by a PCPI. The summary map denotes a file that is an inclusive logical OR bitmap of all snapmaps. By examining the active and summary maps, the file system can determine whether a block is in use by either the active file system or any PCPI. The space map denotes a file including an array of numbers that describes the number of storage blocks used in a block allocation area. In other words, the space map is essentially a logical OR bitmap between the active and summary maps to provide a condensed version of available "free block" areas within the vbn space. Examples of PCPI and block allocation data structures, such as the active map, space map and summary map, are described in U.S. Patent Application Publication No. US2002/0083037 A1, titled INSTANT SNAPSHOT, by Blake Lewis et al. and published on Jun. 27, 2002, which application is hereby incorporated by reference.

Figure 3:
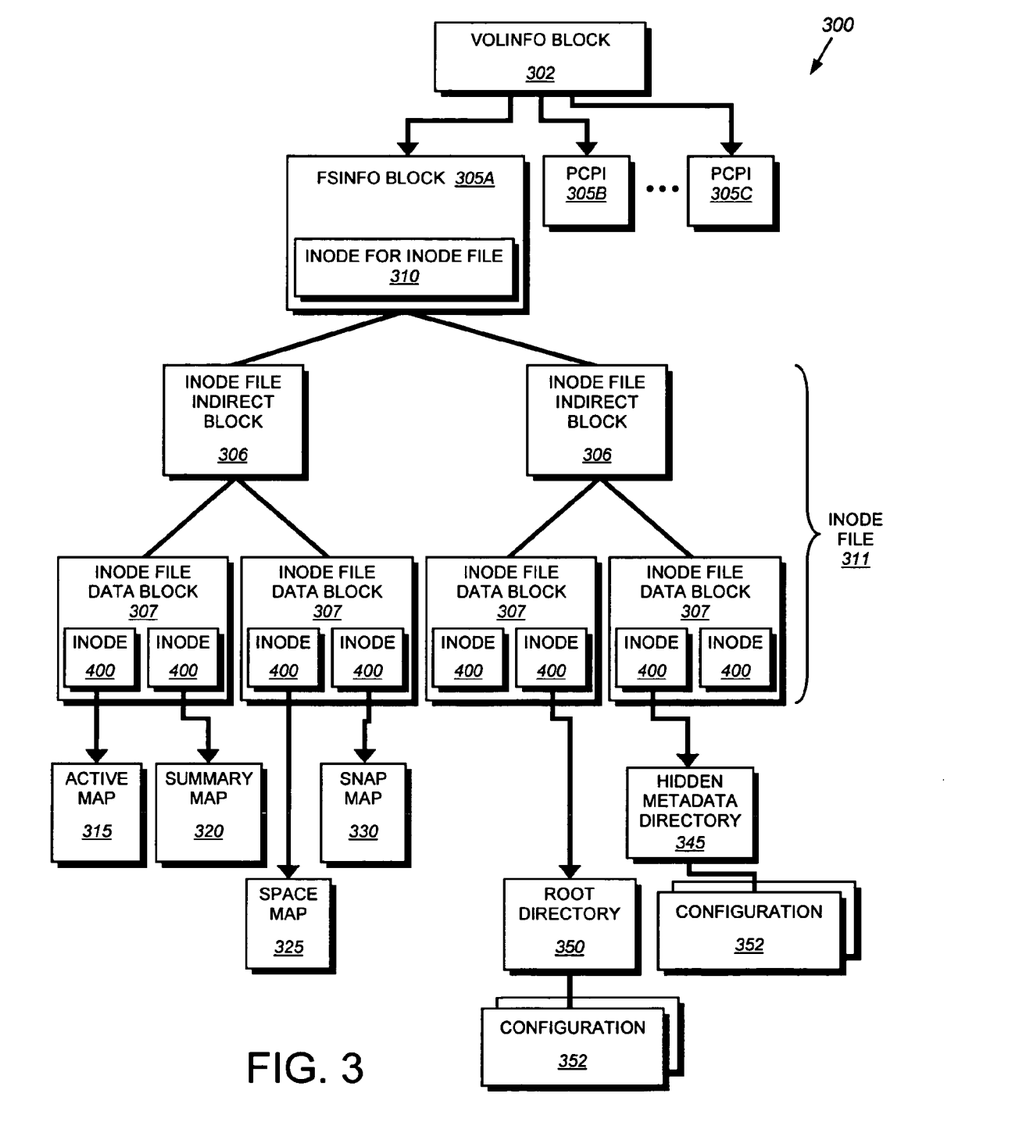
FIG. 3 is a schematic block diagram of on-disk representation of a volume in accordance with an embodiment of the present invention.

FIG. 3 is a schematic block diagram of an exemplary on-disk representation of a volume 300 of a storage system. As noted, a volume is typically associated with a file system and comprises data blocks organized within a vbn space. Each volume has a volinfo block that is preferably stored at a fixed location within, e.g., a RAID group. A volinfo block 302 is the root of the volume, and contains pointers to one or more fsinfo blocks 305A, B, C. Fsinfo block 305A is associated with the active file system, while fsinfo blocks 305B, C may be associated with PCPIs of the volume.

The fsinfo block 305A contains an inode for an inode file 310. All inodes of the write-anywhere file system are organized into the inode file 311. Like any other file, the inode of the inode file is the root of a buffer tree that describes the locations of blocks of the file. As such, the inode of the inode file 310 may directly reference (point to) data blocks 307 of the inode file 311 or may reference indirect blocks 306 of the inode file 311 that, in turn, reference data blocks of the inode file. In this example, the inode for the inode file 310 includes an exemplary buffer tree comprising a plurality of inode file indirect blocks 306 that, in turn, point to inode file data blocks 307. Within each data block of the inode file are inodes 400, each of which serves as the root of a file. Among the inodes of the inode file 310 are inodes for special metadata files, such as an active map 315, a summary map 320, a space map 325, a root directory 350 and a metadata directory 345. All user files in the file system are organized under the root directory 350, while various metadata files associated with the file system are stored under the metadata directory 345. Notably, a set of configuration files 352 may be organized under the root directory 350 and/or the hidden metadata directory 345. As above noted, these configuration files specify options for various attachments of the storage system and are illustratively implemented as text files; although, in alternate embodiments, the configuration files may be in other formats.

As described herein, an advantage of the present invention is that the configuration files 352 may be efficiently compared to determine what, if any, differences exist between the configurations that stored in the active file system. This advantage may be extended to enable efficient comparison of configuration stored within a PCPI created at some point in the past. As PCPIs are accessible in a manner similar to the active file system, the configuration differencing command of the present invention may not only compare different configurations stored within the active file system, but also configurations stored in any PCPIs of the file system.

D. Determining Configuration Differences

The present invention overcomes the disadvantages of the prior art by providing a system and method for determining differences between configurations of software, such as a storage operating system, executing on a storage system. A novel configuration differencing command is implemented within a user interface of the storage operating system. For each configuration, the configuration differencing command generates a hash table having a plurality of entries, wherein each entry includes (i) a key representing a particular configuration option, and (ii) an associated value representing a current setting of that option for the configuration. An exemplary key/value pair is:

options.admin.http.enable=off where "options.admin.http.enable" is the key and "off" is the value.

Once the hash tables have been generated for all configurations of the software, the configuration differencing command selects a first key from an entry of a first hash table and compares that key with keys from entries of the other hash table. If a matching key exists in an entry of another hash table, the configuration differencing command determines whether the values associated therewith match. If so, then the two entries are removed from both of the hash tables. In an alternate embodiment, the matching entries may be marked as common.

If the values do not match, the configuration differencing command displays the differences to an administrator. Additionally, the configuration differencing command also removes the two entries from both of the hash tables. The configuration differencing command then selects a second key from a second entry of the first hash table and repeats the procedure described above. Once each key from the first hash table has been selected and processed according to the present invention, any keys that are left in the first hash table and in the second hash table (or, in an alternate embodiment, keys that are not marked as common) are keys that are unique to the configuration associated with that table.

Figure 4:
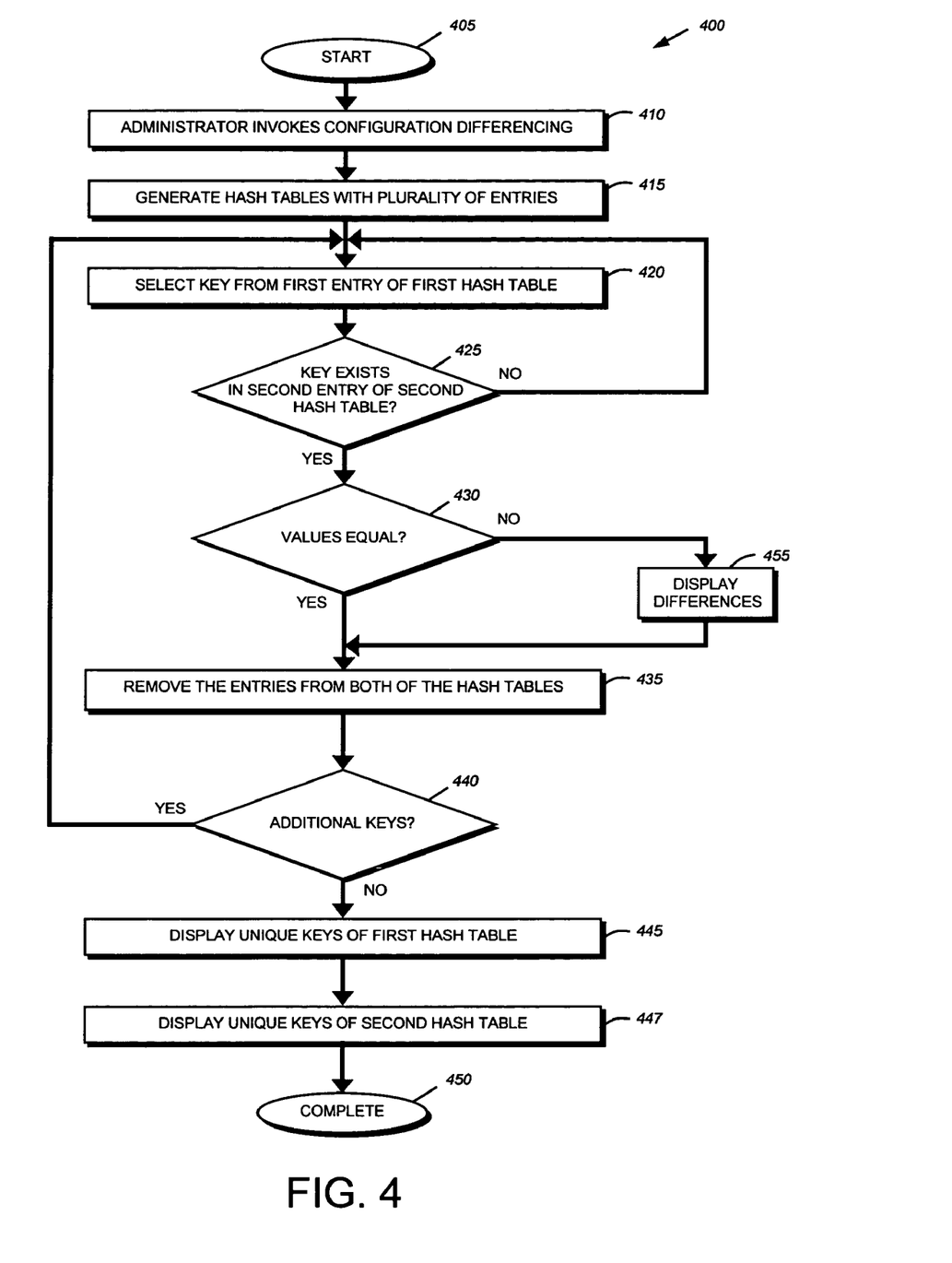
FIG. 4 it is a flowchart detailing the steps of a procedure for determining differences between a plurality of configurations in accordance with an embodiment of the present invention.

FIG. 4 is a flowchart detailing the steps of a procedure 400 for determining differences between a plurality, e.g., two, configurations in accordance with an embodiment of the present invention. The procedure 400 begins in step 405 and continues to step 410 where an administrator invokes the configuration differencing command by e.g., entering the command via a command line interface (CLI) or a graphical user interface (GUI) of the UI 275. The GUI may be implemented in the Data Fabric Manager product, available from Network Appliance, Inc. In alternate embodiments, the configuration differencing command 277 may be executed on a management computer 150.

In response to being invoked, the configuration differencing command generates a set of hash tables in step 415. Illustratively, these hash tables contain a plurality of entries, each including (key, value) pairings wherein the key identifies a particular option (variable) of the configuration and the value identifies the current value for that variable in the configuration. Illustratively, these hash tables may be created by reading each of the configuration files 352 for each of the configurations.

One technique for generation of the hash tables is to read the keys from the configurations such that lower precedence keys are read before higher precedence keys. If a higher precedence key is read later, it overwrites the previously read lower precedence key within the hash table. For example, in one location a key/value pair may appear as:

$/etc/registry.local:options.admin.http.enable=off and in another location as:

options.admin.http.enable=on

In one embodiment, keys preceded by "$/etc/registry.local:" are deemed to have a lower precedence than plain keys. Thus, in accordance with this example, the "options.admin.http.enable=on" key/value pair would be entered into the hash table later (overwriting the "$/etc/registry.local:options.admin.http.enable=off" key/value pair) as it has a higher precedence than the other key/value pair. It should be noted that the precedence ordering may be user configured and that the examples given herein are exemplary only.

Once all keys have been read, the procedure continues and the command then selects a first key from a first entry of a first hash table in step 420 and determines whether a match key exists in a second hash table in step 425. This may be performed quickly by using the key from the first hash table as an index into the second hash table. If a matching key exists in an entry of the second hash table, the command then determines if the values associated with the keys in the first and second hash tables are equal in step 430. This is illustratively performed by comparing the values associated with the matching keys in the two hash tables. If they are equal, the command removes the entries from both hash tables in step 435. In alternate embodiments, if the values are equal, the entries may be marked as being common instead of being removed. Removal of the entries from the hash table may improve performance (e.g., slightly increase speed) of the invention in environments where the number of configuration keys is sufficiently large.

In step 440, a determination is made as to whether there are any additional keys to be checked. If there are no additional keys, the command displays, in step 445, the unique keys of the first hash table, and, in step 447, the unique keys of the second hash table. The procedure then completes in step 450. However, if there are additional keys to be checked, the procedure loops back to step 420 where the command selects another key from the first hash table.

If, in step 425 it is determined that the key does not exist in the second hash table then the command loops back to step 420. If, in step 430, it is determined that the values associated with the two keys are not equal, the procedure branches to step 455 where the command displays the differences between the two configurations. The differences may be that a key exists in the first configuration (identified by the first hash table) and not the second or may be that matching keys exist but have differing values. Note that when displaying differences in either step 455 or steps 445, 447 the configuration differencing command may display the output to the CLI or GUI or may, in alternate embodiments, store the differences in a file for later analysis by an administrator.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise the scope of the invention. Therefore, it is the object of the appended claims to cover all such variations and modifications as come within the true spirit and scope of the invention.

What is claimed is:

1. A method for determining differences between a first configuration and a second configuration of software on a storage system, the method comprising:

generating, by a processor of the storage system, a first hash table having at least one first entry, each first entry including a first key representing a first configuration option of the first configuration and a first value associated with a first setting of the first configuration option and a second hash table having at least one second entry, each second entry including a second key representing a second configuration option of the second configuration and a second value associated with a second setting of the second configuration option;

selecting, by a configuration differencing command executed by the processor, the first key from the first entry of the first hash table;

determining, by the configuration differencing command, if the selected key exists within the second entry of the second hash table;

if so, determining, by the configuration differencing command, whether the first and second values of the first and second entries are equal; and if so, marking, by the configuration differencing command, the first and second entries as identical within the first and second hash tables.

2. The method of claim 1 further comprising in response to determining that the first key does not exist in the second hash table, displaying a set of configuration differences to a user.

3. The method of claim 1 further comprising in response to determining that the value of the first and second entries are not equal, displaying a set of configuration differences to a user.

4. The method of claim 1 further comprising identifying a set of keys unique to the second hash table.

5. The method of claim 1 further comprising identifying a set of keys unique to the first hash table.

6. The method of claim 1 wherein the software comprises a storage operating system.

7. The method of claim 1 wherein generating the first hash table and the second hash table comprises reading at least one configuration file associated with the first configuration and reading at least one configuration file associated with the second configuration.

8. The method of claim 7 wherein the at least one configuration file associated with the first configuration are stored in a root directory.

9. The method of claim 7 wherein the at least one configuration file associated with the first configuration is stored in a metadata directory.

10. A system for determining the differences in configurations between a first configuration and a second configuration of software, the system comprising:
- means for generating a first hash table having at least one first entry, each first entry including a first key representing a first configuration option of the first configuration and a first value associated with a first setting the first configuration option and a second hash table having at least one second entry, each second entry including a second key representing a second configuration option of the second configuration and a second value associated with a second setting of the second configuration option;
- means for selecting a first key from the function of the first hash table and determining if the first key exists within a second entry of the second hash table;
- if so, means for determining whether the first and second values of the first and second entries are equal; and
- if so, means for marking the first and second entries as identical within the first and second hash tables.

11. The system of claim 10 further comprising means for displaying a set of differences in response to determining that the first key does not exist in the second hash table.

12. The system of claim 10 further comprising means for displaying a set of differences in response to determining that the first and second values are not equal.

13. The system of claim 10 further comprising means for identifying a set of keys unique to the second hash table.

14. The system of claim 10 further comprising means for identifying a set of keys unique to the first hash table.

15. The system of claim 10 wherein the software comprises a storage operating system.

16. The system of claim 10 wherein means for generating the first hash table and the second hash table comprises means for reading at least one configuration file associated with the first configuration and means for reading at least one configuration file associated with the second configuration.

17. The system of claim 16 wherein the at least one configuration file associated with the first configuration are stored in a root directory.

18. The system of claim 16 wherein the at least one configuration file associated with the first configuration is stored in a metadata directory.

19. A system for determining the differences in configurations between a first configuration and a second configuration of software, the system comprising:
- a processor;
- a memory configured to store an operating system, the operating system configured to implement a configuration difference command that generates, by the processor, a set of hash tables representative of the first and second configurations and further configured to select a first key representing a particular configuration option of the first configuration from the first hash table and determine if a match key representing a second configuration option of the second configuration exists in the second hash table.

20. The system of claim 19 wherein the configuration differencing command is further configured to, in response to determining that a matching key exists in the second hash table, compare a first value associated with the first key in the first hash table with a second value associated with the match key in the second hash table.

21. The system of claim 20 wherein the configuration differencing command is further configured to display a set of differences between the first and second configurations in response to determining that the first value associated with the first key in the first hash table does not match the second value associated with the matching key in the second hash table.

22. The system of claim 19 wherein the software comprises a storage operating system.

* * * * *